United States Patent

Eckstein et al.

Patent Number: 6,006,852
Date of Patent: Dec. 28, 1999

[54] OPERATING ELEMENT ARRANGEMENT FOR CONTROLLING MOTOR VEHICLE LONGITUDINAL AND TRANSVERSE MOVEMENTS

[75] Inventors: Lutz Eckstein, Stuttgart; Werner Reichelt, Esslingen, both of Germany

[73] Assignee: DaimlerChrysler AG, Germany

[21] Appl. No.: 08/881,386

[22] Filed: Jun. 24, 1997

[30] Foreign Application Priority Data

Jun. 26, 1996 [DE] Germany .................. 196 25 501

[51] Int. Cl.$^6$ .................................................. B60K 26/00
[52] U.S. Cl. ............................................. 180/333; 74/481
[58] Field of Search ............................ 180/333, 315; 74/481, 471 R

[56] References Cited

U.S. PATENT DOCUMENTS

| | | |
|---|---|---|
| 3,022,850 | 2/1962 | Bidwell et al. . |
| 3,323,607 | 6/1967 | Fatamata .................. 180/333 |
| 4,109,745 | 8/1978 | Hveem ..................... 180/333 |
| 4,301,902 | 11/1981 | Gatsos et al. .............. 74/481 X |
| 4,603,752 | 8/1986 | Chambers ................. 180/6.4 |
| 5,086,870 | 2/1992 | Bolduc ..................... 180/333 |
| 5,127,658 | 7/1992 | Openiano .................. 273/311 |
| 5,309,361 | 5/1994 | Drott et al. . |
| 5,497,847 | 3/1996 | Ota et al. .................. 180/333 |
| 5,603,674 | 2/1997 | Rivas et al. ............... 477/170 |
| 5,845,735 | 12/1998 | Miller et al. ............... 180/322 |

FOREIGN PATENT DOCUMENTS

| | | |
|---|---|---|
| 1293041 | 4/1969 | Germany ................. 180/333 |
| 195 48 717.6 | 3/1977 | Germany . |
| 43 01 292 A1 | 6/1985 | Germany . |
| 28 41 786 A1 | 2/1989 | Germany . |
| 2 295 662 | 11/1994 | United Kingdom . |
| 88/09279 | 7/1989 | WIPO . |
| 91/06903 | 6/1993 | WIPO . |

OTHER PUBLICATIONS

13th International Technical Conference on Experimental Safety Vehicles, P. Bränneby et al., Nov. 1991, pp. 224–230 and cover sheet.

Arbeitsplatz Fahrer—Eine ergonomische Studie, H. Bubb, Mar. 1985, 11 pages.

*Primary Examiner*—Christopher P. Ellis
*Attorney, Agent, or Firm*—Evenson McKeown Edwards & Lenahan P.L.L.C.

[57] ABSTRACT

An operating element arrangement controls the longitudinal and transverse movements of a motor vehicle, with a foot-actuatable regulating part for controlling braking operations. The operating element arrangement contains a regulating part for controlling the transverse movement of the vehicle, which is arranged so as to be manually actuatable in the transverse direction of the vehicle and into which a finger-actuatable regulating part for controlling acceleration operations is integrated. A steering wheel and accelerator pedal can be eliminated, and a distinct spatial and operationally functional separation of the activation of braking operations, on one hand, and of acceleration operations, on the other hand are provided.

5 Claims, 2 Drawing Sheets

OPERATING ELEMENT ARRANGEMENT FOR CONTROLLING MOTOR VEHICLE LONGITUDINAL AND TRANSVERSE MOVEMENTS

BACKGROUND AND SUMMARY OF THE INVENTION

This application claims the priority of 196 25 501.5, the disclosure of which is expressly incorporated by reference herein.

This application is related to application Ser. No. 08/881,384 filed on Jun. 24, 1997 in the name of Michael BOEHRINGER et al. for OPERATING ELEMENT ARRANGEMENT FOR CONTROLLING MOTOR VEHICLE LONGITUDINAL AND TRANSVERSE MOVEMENTS; application Ser. No. 08/877,404 filed on Jun. 17, 1997 in the name of Michael BOEHRINGER et al. for OPERATING ELEMENT ARRANGEMENT FOR CONTROLLING MOTOR VEHICLE LONGITUDINAL AND TRANSVERSE MOVEMENTS; application Ser. No.08/883,502 filed on Jun. 26, 1997 in the name of Lutz ECKSTEIN et al. for OPERATING ELEMENT ARRANGEMENT FOR CONTROLLING MOTOR VEHICLE LONGITUDINAL AND TRANSVERSE MOVEMENTS; application Ser. No. 08/882,930 filed on Jun. 26, 1997 in the name of Lutz ECKSTEIN et al. for OPERATING ELEMENT ARRANGEMENT FOR CONTROLLING MOTOR VEHICLE LONGITUDINAL AND TRANSVERSE MOVEMENTS; application Ser. No. 08/883,480 filed on Jun. 26, 1997 in the name of Michael BOEHRINGER et al. for OPERATING ELEMENT ARRANGEMENT FOR CONTROLLING MOTOR VEHICLE LONGITUDINAL AND TRANSVERSE MOVEMENTS.

The present invention relates to an operating element arrangement for controlling the longitudinal and transverse movements of a motor vehicle, with a foot-actuatable regulating part for activating braking operations.

In conventional operating arrangements as are used, for example, in automobiles, a foot-actuatable regulating part is formed by a brake pedal. A foot-actuatable accelerator or driving pedal is provided for activating acceleration operations, and the control of transverse movement, i.e vehicle steering, is carried out via a steering wheel. The paper by P. Bränneby et al., Improved Active and Passive Safety by Using Active Lateral Dynamic Control and an Unconventional Steering Unit", 13th International Technical Conference on Experimental Safety Vehicles, 4th to 7th November 1991, Proceedings Vol. 1, page 224, proposes, as an alternative to the conventional steering wheel, an operating lever which is arranged, for example, on the center tunnel of the vehicle.

Furthermore, a common operating element for controlling the longitudinal and transverse dynamics of a motor vehicle is known, preferably in which the longitudinal dynamics are controlled by actuating the operating element in the longitudinal direction of the vehicle and the transverse dynamics are controlled by actuating the operating element in the transverse direction, in particular as a rotational movement corresponding to the conventional steering wheel.

An operating element is disclosed in U.S. Pat. No. 3,022,850 in the form of a control stick which is mounted on a frame so as to be pivotable about a horizontal transverse axis, the frame, in turn, being rotatable about a horizontal longitudinal axis. A further operating element of this type, which is alluded to in a paper by H. Bubb, Arbeitsplatz Fahrer—Eine ergonomische Studie [Driver's area—An Ergonomic Study], Automobil-Industrie [Automobile Industry] 3/85, page 265, contains two mechanically interconnected plate-like handles which are located closely next to one another and which are attached to the end of a bar which is guided movably on the vehicle center console. The longitudinal dynamics of the vehicle are controlled by displacing the bar in the longitudinal direction of the vehicle, and the transverse dynamics are influenced by rotating the two plate-like handles in the transverse plane of the vehicle.

German Patent Application 195 48 717.6 discloses an operating element arrangement for controlling the longitudinal and transverse movements of a motor vehicle. The arrangement comprises two operating elements which can be actuated independently of one another and each of which is intended for controlling the longitudinal and transverse movements and is preferably designed as a manually actuatable control stick. Electronic coupling of the two operating elements prevents command collisions, e.g. caused by the additive superposition of the control command signals, due to the manual passive switching of one operating element in each case or due to the assignment of different priorities for the two operating elements.

DE 28 41 786 A1 discloses an operating element arrangement for controlling the longitudinal and transverse movements of a motor vehicle. The arrangement contains, for controlling longitudinal acceleration operations, a conventional, foot-actuatable accelerator pedal and a manually actuatable actuating wheel which is coupled mechanically to the latter and which is arranged on a conventional steering wheel, serving for the control of transverse movement, so as to be rotatable together with the said steering wheel and displaceable axially relative thereto. This arrangement also enables the disabled to drive motor vehicles having a conventional pedal assembly by making the pedal controls hand actuatable.

DE 43 01 292 A1 describes an arrangement in which, in addition to a conventional steering wheel serving for the control of transverse movement, a manually actuatable brake knob coupled to a conventional brake pedal and intended for activating the vehicle brake. Furthermore, the arrangement contains a device for regulating the longitudinal speed, and the desired speed value can be decremented merely by touching the brake knob and can be incremented by actuating push buttons provided in the steering wheel. In a standard operating mode without speed regulation, acceleration operations are controlled via a conventional, foot-actuatable accelerator pedal.

U.S. Pat. No. 5,309,361 discloses a foot-actuatable operating element arrangement for controlling the longitudinal movement of a vehicle, in which the brake pedal and accelerator pedal are hemispherical force sensor elements which give way to an external pressure actuation force.

An object of the present invention is to provide an operating element arrangement for controlling the longitudinal and transverse movements of a motor vehicle with a high level of driving and operating comfort.

The present invention achieves this object by providing an operating element arrangement having a foot-actuatable regulator configured and arranged to control braking operations, and a manually actuatably, steering control stick configured to control transverse movement of the motor vehicle and arranged to be subjected to actuating forces acting in a transverse direction of the motor vehicle, wherein a finger-actuatable regulating part configured to control acceleration operations of the motor vehicle is integrated into the steering control stick.

In the arrangement of the present invention, a regulating part which is manually actuatable in the transverse direction of the vehicle and is in the form of a steering control stick controls the transverse movement of the vehicle, i.e. vehicle steering. Integrated into this manually actuatable regulating part is a finger-actuatable regulating part which controls acceleration operations and which consequently performs the function of a conventional, foot-actuatable accelerator pedal.

In comparison with conventional arrangements having a steering wheel and a brake and accelerator pedal assembly, numerous advantages are afforded. Thus, for example, active safety with regard to the longitudinal dynamics is improved. That is, for alternate acceleration and braking, the foot no longer has to be changed over between the accelerator pedal and brake pedal. Instead, the activation of acceleration operations is separated from the activation of braking operations spatially and, as regards the operating mode, distinctly.

Moreover, braking operations in accordance with the present invention can be initiated substantially more quickly. Furthermore, dispensing with the accelerator pedal does away with the risk of actuating the wrong pedal. Further, operating safety and operating comfort are increased by the possibility of driving the vehicle more intuitively and with a more comfortable body posture. By dispensing with the accelerator pedal and with the conventional steering wheel, free spaces occur in the driver's seat region and may be utilized for the more advantageous placing of other instruments in the dashboard region.

In addition, with a laterally arranged steering control stick as contemplated by the present invention, the driver's arms need not be held stretched so far forwards as in the case of the conventional steering wheel. Furthermore, dispensing with the accelerator pedal and with the steering wheel improves passive safety; i.e. in the event of a rear-end collision, the risks of injury associated with these elements does not arise. Furthermore, the omission of the conventional steering wheel and accelerator pedal may be utilized for the purpose of shortening the vehicle, while, at the same time, ensuring the same amount of available space, and of providing more convenient possibilities for getting into the vehicle.

In comparison with known arrangements having an operating element which controls both longitudinal and transverse dynamics and, for this purpose, can be subjected to an associated actuating force in the longitudinal and transverse directions, an advantage of the present operating element arrangement is that only the transverse movement of the vehicle is influenced by the force exerted on the manually actuatable regulating part. There is no possibility of an actuating force component in the longitudinal direction of the vehicle inadvertently having an undesired influence on the longitudinal dynamics of the vehicle at the same time. On the contrary, the vehicle driver's hand actuating the regulating part may be supported on this regulating part in the longitudinal direction of the vehicle.

In an embodiment of the operating element arrangement according to the present invention, the steering control stick can be arranged to the side of a driver's seat. If required, a steering control stick may be provided on both sides of the driver's seat, in which case the two sticks can be operated in parallel, suitable measures ensuring that no command collisions occur.

The present invention can incorporate the finger-actuatable regulating part into the manually actuated regulating part.

An operating element arrangement according to the present invention can contain, as a foot-actuatable regulating part for the control of braking operations, a large-area force sensor element which is arranged in the driver's seat floor region, i.e. approximately where the brake pedal is conventionally located. The large-area force sensor element, instead of a pedal, improves passive safety, because, not only the accelerator pedal, but also the brake pedal, and consequently the risks of injury associated with this pedal assembly, are absent.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
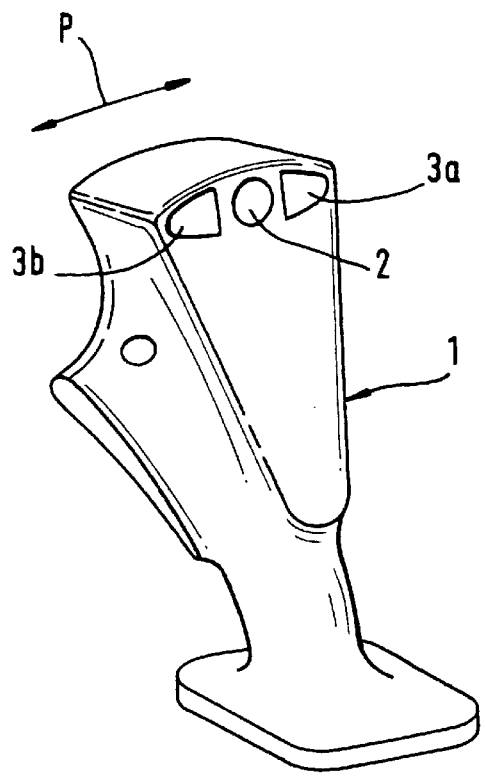
FIG. 1 is a schematic perspective view of a manually actuatable steering control stick with an integrated finger-actuatable accelerator steering finger of an operating element arrangement in accordance with the present invention for controlling the longitudinal and transverse movements of a motor vehicle.
Figure 2:
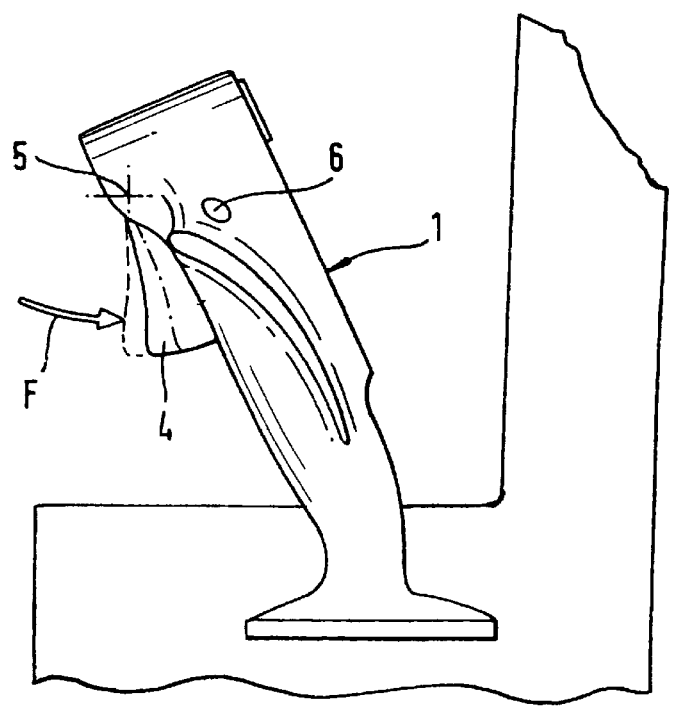
FIG. 2 is a schematic perspective view of the steering control stick of FIG. 1 in another viewing direction showing the steering control stick laterally of a schematically shown driver's seat.

FIGS. 1 and 2 show a manually actuatable regulating part in the form of a steering control stick 1 for controlling the motor vehicle transverse movement or steering. The control stick forms a component of an operating element arrangement for controlling the longitudinal and transverse movements of the motor vehicle. The steering control stick 1 is connected to the vehicle body in a manner which will be known to those skilled in the art in light of the disclosure herein such that it initiates steering operations under the influence of an actuating force acting in the transverse direction of the vehicle, but does not give way to forces in the longitudinal direction of the vehicle, these forces also not initiating any control activities.

The vehicle driver's hand can thereby be supported on the steering control stick 1 in the longitudinal direction of the vehicle. This restriction of the function of the steering control stick 1 to the transverse direction of actuation is illustrated in FIG. 1 by a double arrow P, which symbolizes deflections or operating forces in the transverse direction of the vehicle.

For transverse movement control, the steering control stick 1 can, if required, be configured as a passive, isometric or active regulating part. In a passive configuration, the steering control stick 1 is connected to the vehicle body so as to be movable in the transverse direction of the vehicle. A movement of the regulating part to the left then initiates a corresponding steering movement for the vehicle to the left, and, similarly, a movement of the regulating part to the right leads to a steering lock to the right. The movement of the regulating part can be a transverse movement or a pivoting movement.

In an isometric configuration of the regulating part, the steering control stick 1 remains fixed, and an associated force sensor assembly senses the transverse actuating force acting thereon. A following control unit of the operating element arrangement then sets the steering angle associated with the sensed actuating force.

In an active configuration of the regulating part, the setting of the steering angle occurs as a function of the transverse actuating force exerted or of the deflection, and also automatic deflection of the steering control stick 1 or subjecting the stick 1 to reaction force takes place as a function of the respective actual steering-angle value or other actual vehicle variables, as feedback information which can be detected by the driver.

In FIG. 1, a button 2 aligned in the vehicle longitudinal direction activates a horn. On appropriate sides of the button 2, two direction indicator actuating buttons 3a, 3b are integrated as additional operating functions on one side of the steering control stick 1. These buttons 2, 3a, 3b can easily be operated by the driver, for example with the thumb of the hand grasping the steering control stick 1, without the steering control stick 1 having to be released for this purpose.

Furthermore, as can be seen in more detail in FIG. 2, a finger-actuatable regulating part constituted by an accelerator steering finger 4 is integrated into the steering control stick 1. The accelerator steering finger 4 can easily be actuated by the driver with one or more fingers of the hand grasping the steering control stick 1. The accelerator steering finger 4 is pivotable on the steering control stick 1 about a pivot axis 5. The accelerator steering finger 4 is deflected under the effect of a corresponding actuating force F as seen in FIG. 2, this being recorded by an associated conventional sensor assembly in a known way.

A control unit of the operating element arrangement follows the sensor assembly and converts the sensed movement of the accelerator steering finger 4 into a corresponding activation of a vehicle acceleration operation. For this purpose, depending on the system design, a specific throttle-flap setting or a specific desired acceleration value may correspond to the respective actuating travel of the accelerator steering finger. In the latter case, the vehicle maintains the instantaneous speed if no actuating force is exerted on the accelerator steering finger 4, whereas it accelerates to the maximum extent if the lever 4 is deflected to the maximum extent.

The accelerator steering finger 4 allows the vehicle acceleration to be adjusted in comparatively finely graduated steps by finger actuation. As an alternative to the illustrated accelerator steering finger 4, a regulating wheel, a sliding element or a pressure sensor element may also be integrated into the steering control stick 1 as a functionally identical finger-actuatable regulating part without departing from the scope of the present invention.

As also seen in FIG. 2, a "Tempomat" activation button 6 is integrated into the steering control stick 1 and results, when pressed or activated, into the activation and deactivation of a vehicle speed regulator.

Figure 3:
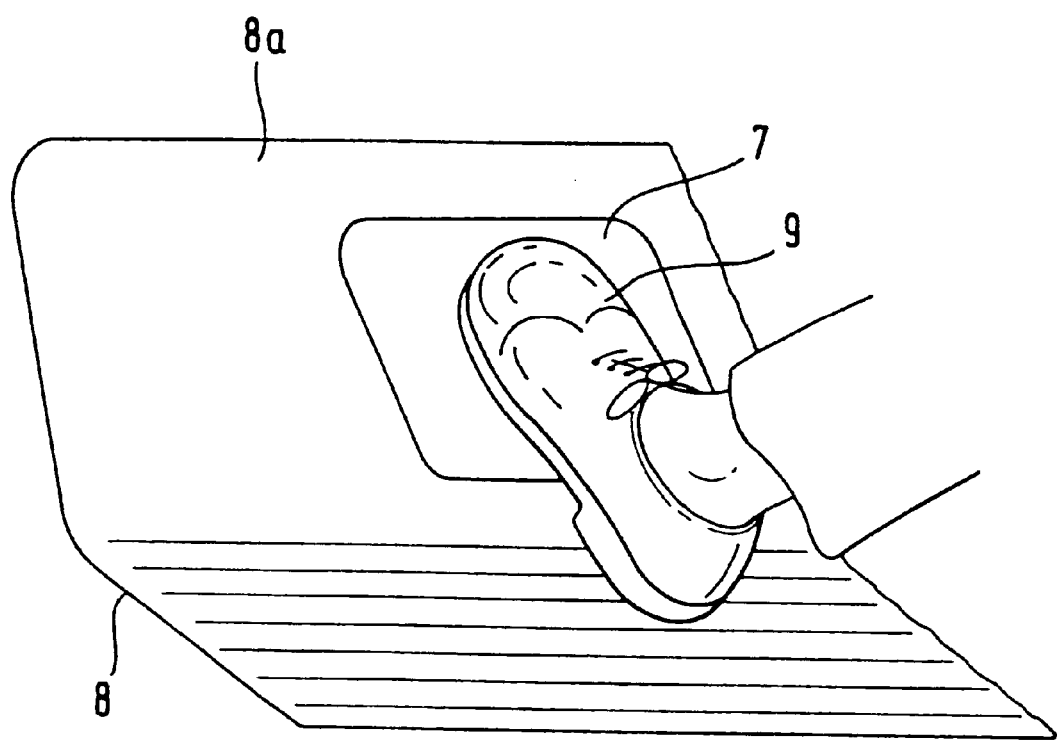
FIG. 3 is a schematic perspective view of the driver's seat foot region, in which a foot-actuatable regulating part of the operating element arrangement having the steering control stick of FIGS. 1 and 2 is arranged.

The foot-actuatable regulating part shown in FIG. 3 is in the form of a large-area force sensor element 7 which forms that component of the operating element arrangement for controlling the longitudinal and transverse movements of the motor vehicle to control braking operations. The force sensor element 7 is located in the driver's seat floor region in front of a driver's seat (not shown) in the obliquely ascending portion 8a of a floor panel 8. Whereas the finger-actuatable accelerator steering finger 4 replaces a conventional accelerator pedal, the force sensor element 7 takes the place of a conventional brake pedal. Pedal-related risks of injury are therefore ruled out, and the large-area force sensor element 7 can easily be actuated by the driver with one foot 9.

Strict spatial separation of the brake control by foot actuation, on one hand, and acceleration control by finger actuation, on the other hand, prevents an inadvertent activation of an acceleration operation instead of a braking operation with great reliability. The control unit (not shown) belonging to the operating element arrangement converts the actuating force exerted by the foot 9 on the force sensor element 7 into a corresponding activation of the vehicle brake system.

If required or desired, a steering control stick according to FIGS. 1 and 2 can be provided on each side of the driver's seat. These sticks are then coupled to the associated control unit so as to enable the driver to drive the vehicle alternately with the right hand, the left hand or both hands, with suitable measures being taken through conventional control logic to avoid command collisions.

The operating element arrangement according to the present invention thus makes it possible to drive the vehicle comfortably with a large amount of free space in the region of the driver's seat as a result of the omission of a steering wheel and an accelerator pedal. The brake pedal may be retained or preferably be replaced by the illustrated large-area force sensor element. For the foot-actuatable regulating part for controlling braking operations, a passive, isometric or active configuration is possible in the same way as for the steering control stick and the finger-actuatable regulating part.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An operating element arrangement for controlling longitudinal and transverse movements of a motor vehicle, comprising a foot-actuatable regulator configured and arranged to control braking operations, and a manually actuatably, steering control stick configured to control transverse movement of the motor vehicle and arranged to be subjected to actuating forces acting in a transverse direction of the motor vehicle, wherein a finger-actuatable regulating part configured to control acceleration operations of the motor vehicle is integrated into the steering control stick.

2. The operating element arrangement according to claim 1, wherein the steering control stick is arranged laterally to a driver's seat in the motor vehicle.

3. The operating element arrangement according to claim 1, wherein the finger-actuatable regulating part is selected from one of a regulating lever, a regulating wheel, a sliding element and a pressure sensor element.

4. The operating element arrangement according to claim 1, wherein the foot-actuatable regulator comprises a large-area force sensor element arranged in a front, driver's seat floor region.

5. A method for controlling longitudinal and transverse movements of a motor vehicle, comprising the step of controlling braking operations via a foot-actuatable regulator, controlling transverse movement of the motor vehicle, a manually actuatably, steering control stick by subjecting the control stick to actuating forces in a transverse direction of the motor vehicle, and controlling acceleration of the motor vehicle via a finger-actuatable regulating part integrated into the control stick.

* * * * *